US005868121A

United States Patent [19]

Brown et al.

[11] Patent Number: 5,868,121

[45] Date of Patent: Feb. 9, 1999

[54] METHOD AND APPARATUS FOR RELIEVING A DIFFERENTIAL PRESSURE ACROSS A GASEOUS FUEL ADMISSION VALVE OF A DUAL FUEL ENGINE

[75] Inventors: Scott C. Brown, Peoria; Jeffery T. Fischer, Brimfield; Eric W. Ohlson, Edelstein, all of Ill.; Martin L. Willi, Lafayette, Ind.

[73] Assignee: Caterpillar Inc., Peoria, Ill.

[21] Appl. No.: 995,254

[22] Filed: Dec. 19, 1997

[51] Int. Cl.[6] .................... F02M 21/00

[52] U.S. Cl. .................... 123/526; 123/525; 123/575; 123/527

[58] Field of Search .................... 123/525, 526, 123/529, 575, 527

[56] References Cited

U.S. PATENT DOCUMENTS

| | | | |
|---|---|---|---|
| 4,445,336 | 5/1984 | Inoue | 160/605.1 |
| 4,597,364 | 7/1986 | Young . | |
| 4,696,275 | 9/1987 | Kushi et al. | 123/478 |
| 4,817,568 | 4/1989 | Bedford | 123/431 |
| 4,955,326 | 9/1990 | Helmich . | |
| 5,018,486 | 5/1991 | Davis et al. | 123/184.47 |
| 5,136,986 | 8/1992 | Jensen . | |
| 5,150,685 | 9/1992 | Porter et al. . | |
| 5,224,457 | 7/1993 | Arsenault et al. . | |
| 5,323,799 | 6/1994 | Pengler | 137/115.14 |
| 5,398,724 | 3/1995 | Vars et al. . | |
| 5,522,369 | 6/1996 | Povinger | 123/527 |
| 5,526,786 | 6/1996 | Beck et al. . | |
| 5,546,911 | 8/1996 | Iwamoto et al. | 123/497 |

*Primary Examiner*—Henry C. Yuen
*Assistant Examiner*—Hai Huynh
*Attorney, Agent, or Firm*—Michael J. Nieberding

[57] ABSTRACT

A fuel pressure relief system for a dual fuel engine including at least one gaseous fuel admission valve positioned between a gaseous fuel inlet region and an air intake region is provided. The system includes a first pressure sensor positioned in the gaseous fuel inlet region and a second pressure sensor positioned in the air intake region. An electronic controller is connected to the first pressure sensor and the second pressure sensor. A gaseous fuel vent path extends between the gaseous fuel inlet region and a portion of an air intake path of the engine. A vent valve is positioned along the gaseous fuel vent path and is connected to the electronic controller for control thereby. When the differential pressure across the gaseous fuel admission valve exceeds a predetermined level the fuel vent valve is opened to relieve the pressure.

17 Claims, 4 Drawing Sheets

40 AIR 70 80 82 84 SWITCH 68 46 74 62 P2 76 50 50 10 ECM 56 10 48 48 P1 MEMORY 58 44 52 64 54 60 66 42 72

*Fig. - 1 -*
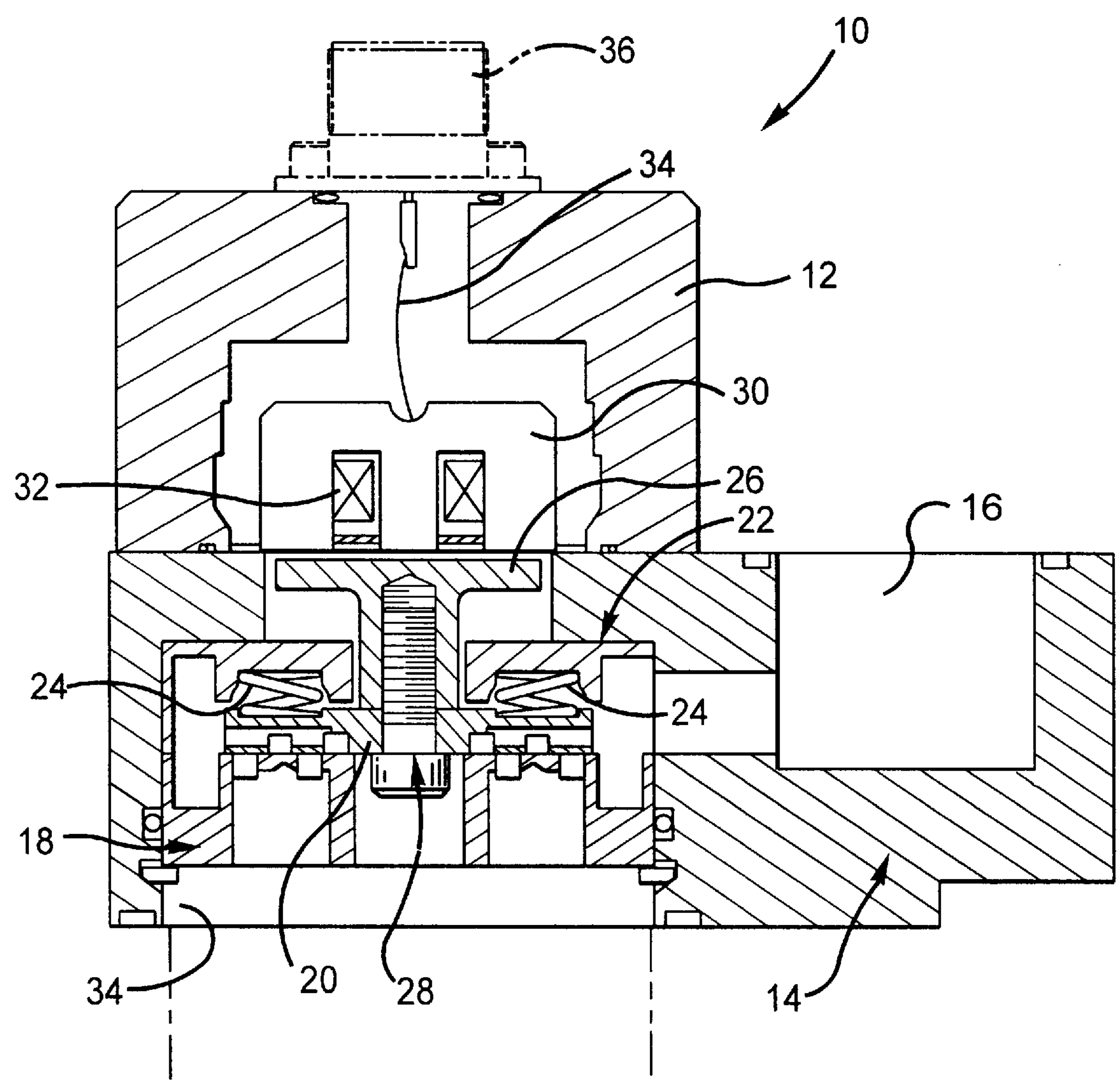

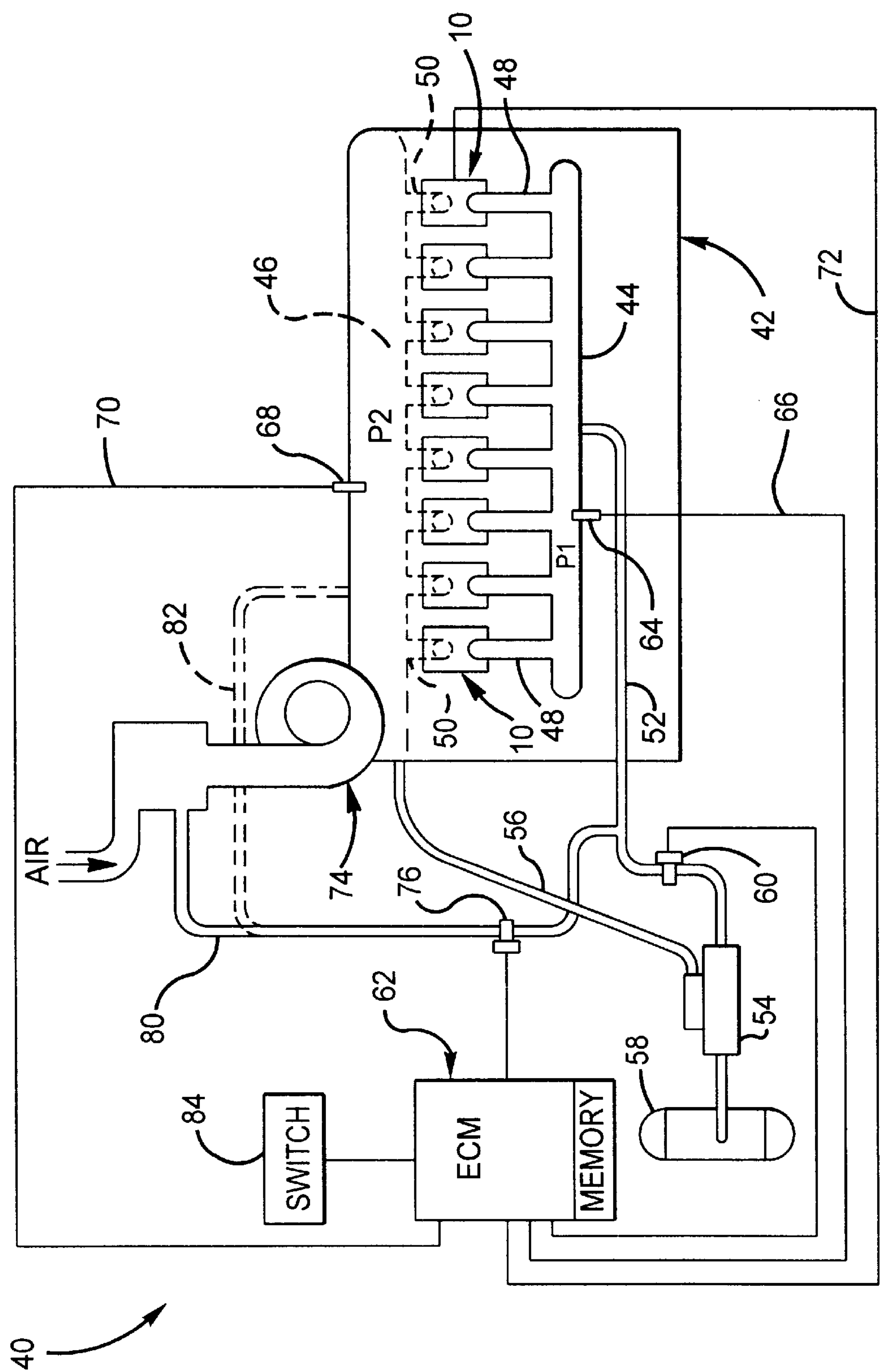
Fig. - 2 -

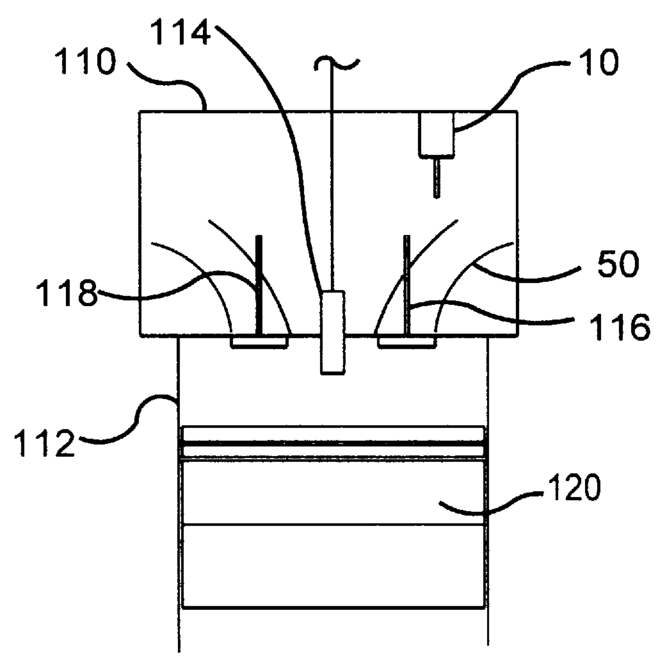
*Fig. - 3 -*

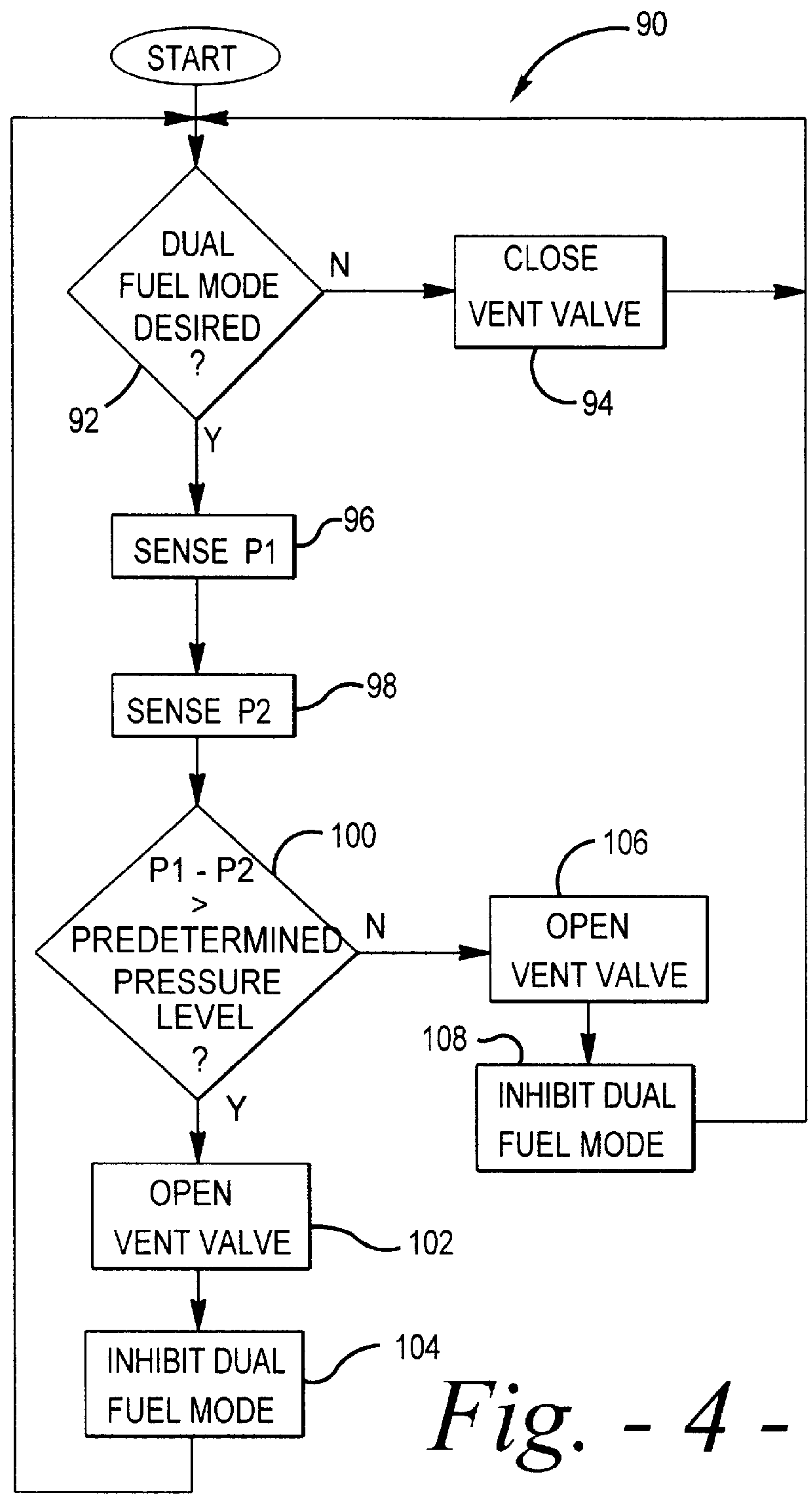
*Fig. - 4 -*

METHOD AND APPARATUS FOR RELIEVING A DIFFERENTIAL PRESSURE ACROSS A GASEOUS FUEL ADMISSION VALVE OF A DUAL FUEL ENGINE

TECHNICAL FIELD

This invention relates generally to dual fuel engines, and more particularly, to a method and apparatus for relieving an excessive differential pressure across a gaseous fuel admission valve of a dual fuel engine.

BACKGROUND ART

A dual fuel engine can typically operate in two modes. In a strictly liquid fuel mode a liquid fuel, such as diesel fuel, is injected directly into an engine cylinder or a precombustion chamber as the sole source of energy during combustion. In a dual fuel mode a gaseous fuel, such as natural gas, is mixed with air in an intake port of a cylinder and a small amount of diesel fuel is injected into the cylinder or the precombustion chamber in order to ignite the mixture of air and gaseous fuel. In such dual fuel engines, one or more of such gaseous fuel admission valves are positioned between a gaseous fuel inlet region and an air intake region of the engine. The pressure of the gaseous fuel inlet region is regulated in attempt to maintain the pressure within such region at a predetermined set amount higher than the pressure within the air intake region so that when the valve is opened the gaseous fuel will pass into the air intake region for mixing with the air. Thus, there generally exists some differential pressure across the gaseous fuel admission valves.

A solenoid actuated gaseous fuel admission valve such as that described in U.S. Pat. No. 5,398,724 can be used to deliver the gaseous fuel in such engines. The nature of solenoid actuated gaseous fuel admission valves is such that a current delivered to a solenoid coil thereof actuates the valve. However, gaseous fuel admission valves have certain limitations, including that the valve cannot be properly actuated, that is opened, if the pressure difference across the valve exceeds a certain maximum level. The maximum differential pressure rating for a given valve may vary according to size and make of the valve.

During certain operating conditions within a dual fuel engine it is possible that the differential pressure across the gaseous fuel admission valves will exceed the maximum differential pressure of the valves, such that the engine cannot be properly operated in a dual fuel mode. For example, one such case would be where the engine is operating in a dual fuel mode at a high engine load. In such case the pressure withn the air intake region is high and the pressure within the gaseous fuel inlet region is regulated to a slightly higher level. Engine operation might then be switched to a liquid fuel mode. During the liquid fuel mode if the load on the engine drops, the pressure within the air intake region also drops. However, the pressure within the gaseous fuel inlet region remains high, and possibly high enough that if engine operation were to switch to a dual fuel mode at the low engine load, the differential pressure across the gaseous fuel admission valves would exceed the maximum differential pressure rating of the valves.

Accordingly, the present invention is directed to overcoming one or more of the problems as set forth above.

DISCLOSURE OF THE INVENTION

In one aspect of the present invention a method for relieving a differential pressure across a gaseous fuel admission valve located in a dual fuel engine is provided wherein the engine includes a gaseous fuel inlet region at a first side of the admission valve and an air intake region at a second side of the admission valve. A vent valve is positioned between the fuel inlet region and a portion of an air intake path of the engine. The method includes sensing a pressure at the first side of the admission valve and sensing a pressure at the second side of the admission valve. A determination is made as to whether a difference between the sensed pressures exceeds a predetermined pressure level and the open/closed condition of the vent valve is controlled based upon the determination.

In another aspect of the present invention a fuel pressure relief system for a dual fuel engine including at least one gaseous fuel admission valve positioned between a gaseous fuel inlet region and an air intake region is provided. The system includes a first pressure sensor positioned in the gaseous fuel inlet region and a second pressure sensor positioned in the air intake region. An electronic controller is connected to the first pressure sensor and the second pressure sensor. A gaseous fuel vent path extends between the gaseous fuel inlet region and a portion of an air intake path of the engine. A vent valve is positioned along the gaseous fuel vent path and is connected to the electronic controller for control thereby.

BRIEF DESCRIPTION OF DRAWINGS

FIG. 1 shows a cross-sectional view of a normally-closed solenoid actuated valve assembly;

FIG. 2 shows an engine system in accordance with one embodiment of the present invention;

FIG. 3 shows a representative cylinder and cylinder head; and

FIG. 4 shows a flowchart depicting the steps in accordance with one embodiment of the present invention.

BEST MODE FOR CARRYING OUT THE INVENTION

Referring to the drawings, numeral 10 in FIG. 1 is a solenoid actuated gaseous fuel admission valve as shown and described in U.S. Pat. No. 5,398,724. Valve 10 includes a E-core housing 12 and a valve assembly housing 14 including a gaseous fuel inlet port 16. The valve assembly includes a stationary plate or disk 18, a movable plate or disk 20, a spring seat structure 22, springs 24, a low mass armature 26, and a screw 28 securing the movable disk 20 to the low mass armature 26. Positioned within E-core housing 12 is an E-core 30 including a solenoid coil 32 wound thereon, the solenoid coil 32 being connected via wires 34 to an electrical connector 36 which may be mounted on the E-core housing 12.

Valve 10 is a normally-closed valve in which springs 24 hold a lower surface of movable disk 20 against an upper surface of stationary disk 18, the two surfaces being configured to provide a sealed relationship. A top surface of movable disk 20 is spaced from the spring seat structure to allow upward movement of the movable disk 20. Similarly, an upper surface of low mass armature 26 is spaced from the bottom of E-core 30 to allow upward movement of the low mass armature 26. When an actuating current is delivered to coil 32 the low mass armature 26 is pulled upward toward the B-core 30 and, being attached thereto, movable disk 20 is similarly pulled upward. When pulled upward, the bottom surface of movable disk 20 moves out of its sealed relationship with respect to the top surface of stationary disk 18, allowing gaseous fuel to flow from inlet port 16, through openings in the stationary disk 18, and out a gaseous fuel outlet 34. A pressure on the fuel inlet port side of the valve is represented by P1 and a pressure on the fuel outlet, side of the valve is represented by P2. If the pressure difference (P1–P2) across the valve exceeds the maximum differential pressure rating of the valve, movement of the disk 20 may be prevented. A typical maximum differential pressure rating for such a valve 10 might be about 2 bar.

A dual fuel engine 42 incorporating a differential pressure relief system 40 in accordance with the present invention is illustrated in FIG. 2. Eight gaseous fuel admission valves 10 are shown, however, it is recognized that the number of valves will typically correspond to the number of engine cylinders, which could vary. Similarly, although an in-line engine is depicted, it is recognized that the differential pressure relief system could be incorporated into other engine types including v-type engines or rotary engines. Each gaseous fuel admission valve 10 is positioned between a gaseous fuel manifold 44 and an air intake manifold 46. A fuel passage 48 extends from fuel manifold 44 to each valve 10. Similarly a cylinder intake port 50 extends from the air intake manifold 46 to each cylinder.

Referring to FIG. 3 which shows an exploded view of a representative cylinder head 110 for a representative cylinder 112, a fuel injector 114 is provided and would be connected to ECM 62 for injecting diesel fuel into cylinder 12. Also shown are intake valve 116, exhaust valve 118, and piston 120.

Referring again to FIG. 2, fuel manifold 44 is connected via fuel path 52 to a balance regulator 54, the balance regulator 54 being connected via a balance line 56 to the air intake manifold 46. The balance regulator 54 is connected between a source of gaseous fuel 58 and fuel path 52. A solenoid operated gaseous fuel shut off valve 60 may also be positioned between the balance regulator 54 and the fuel inlet manifold 44, and may be of the normally-closed type.

An electronic control module (ECM) 62 is connected to a first pressure sensor 64 via conductive path 66 and to a second pressure sensor 68 via conductive path 70 for receiving pressure indicator signals from each of such sensors. The use of such sensors is well known in the art and therefore a detailed description of the sensors is not included herein. ECM 62 is also connected for controlling each of the gaseous fuel admission valves 10, such as by conductive path 72. In this regard it is know to include driver circuitry within such an ECM 62 for delivering current signals to such valves. However, it is recognized that such driver circuitry could be formed separate from, but connected to, ECM 62.

Air intake manifold 46 is positioned at a downstream side of a turbocharger 74, the upstream side of the turbocharger typically being connected to receive air from an air cleaner (not shown). Further, such an engine might also include an aftercooler (not shown) at the downstream side of turbocharger 74.

As used herein the terminology "fuel inlet region" is intended to include any portion of the fuel system wherein the pressure of the gaseous fuel should be fairly representative of the pressure experienced at the immediate upstream side of the gaseous fuel admission valve. For example, in FIG. 2 such would include the region extending from fuel shut off valve 60 along fuel path 52 into fuel inlet manifold 44, as well as fuel passages 48. However, if the fuel shut off valve 60 were instead positioned between the source of gaseous fuel 58 and the balance regulator 54, it is recognized that the fuel inlet region would include the fuel region extending from the balance regulator 54 along fuel path 52 into fuel inlet manifold 44, as well as fuel passages 48.

As used herein the terminology "air intake path" is intended to include the entire path taken by air before entering the engine cylinders, particularly from the output of the air cleaner to the cylinders. Referring to FIG. 2, such path extends at least from the upstream side of turbocharger 74 to the downstream side of turbocharger 74, and includes the air intake manifold 44 and each cylinder intake port 50.

As used herein the terminology "air intake region" is intended to include those portions of the air intake path in which the pressure should be fairly representative of the pressure experienced at the immediate downstream side of the gaseous fuel admission valve.

The differential pressure relief system 40 includes a fuel vent path extending between the fuel inlet region and a portion of the air intake path, the vent path including a solenoid operated vent valve 76 positioned therealong and connected to ECM 62. For example, in one embodiment the vent path includes paths 78 and 80, extending to an upstream side of turbocharger 74. In another embodiment the vent path could include paths 78 and 82, extending to a downstream side of turbocharger 74. Such paths 78, 80, 82 might typically be formed by piping suitable for carrying fuel. In either case vent valve 76 may be a normally-closed type valve which prevents fuel flow along the vent path unless opened by a control signal from ECM 62. If the vent valve 76 is opened, fuel can then flow from the fuel inlet region to the portion of the air intake path in order to relieve fuel pressure within the fuel inlet region. Thus, if an excessive differential pressure exists across the gaseous fuel admission valves 10, pressure relief system 40 can be utilized to reduce the differential pressure to an acceptable level. It is recognized that it may be desirable to prevent venting of too much gaseous fuel into the intake air flow too quickly. Accordingly, the piping for the fuel vent path may be sized accordingly, a flow regulator could be included, or any other known means for limiting flow could be incorporated.

In terms of the positioning of pressure sensor 64, it is preferred that such sensor be positioned within fuel inlet manifold 44 but it is recognized that such sensor could be positioned anywhere within the fuel inlet region. With respect to positioning of pressure sensor 68 it is preferred that such pressure sensor be positioned within air intake manifold 46, but it is recognized such sensor could be positioned anywhere in the air intake region.

Industrial Applicability

Flowchart 90 of FIG. 4 depicts possible operating steps in accordance with the present invention. Such steps can be incorporated into the programming of processing means, such as a microcontroller or microprocessor of ECM 62, by techniques well known to those of ordinary skill in the art. It is anticipated that the engine will normally be operated in a liquid fuel mode prior to performing such steps. A determination is made at step 92 as to whether engine operation in the dual fuel mode is desired. In most dual fuel engines this determination is made by ECM 62 based upon the status of an operator input and additional sensed engine parameters. In other words, an operator controlled switch 84 can be activated when it is desired to operate the engine in a dual fuel mode and other engine parameters may be monitored by ECM 62 to determine if a dual fuel mode is desired. If operation in the dual fuel mode is not desired, the vent valve 76 is closed at step 94. If vent valve 76 is a normally closed valve step 94 will simply involve refraining from opening the vent valve 76, or ceasing delivery of a valve actuating signal to the vent valve 76. If operation in the dual fuel mode is desired, ECM 62 senses a pressure P1 within the fuel inlet region at step 96 based upon one or more signals received from pressure sensor 64. Similarly, ECM 62 senses a pressure P2 within the air intake region at step 98 based upon one or more signals received from pressure sensor 68. The difference (P1–P2) between the two pressures is then compared with a predetermined pressure level at step 100. The predetermined pressure level is preferably selected as the maximum differential pressure rating of the gaseous fuel admission valves 10. If the pressure difference (P1–P2) is greater than the predetermined pressure level, at step 102 ECM 62 effects delivery of a valve actuating signal to vent valve 76 in order to open such valve. Operation of the engine in a dual fuel mode can also be inhibited at step 104. It is desirable to inhibit operation in a dual fuel mode because it is presumed that the gaseous fuel admission valves 10 will not function properly if the differential pressure (P1–P2) is greater than the predetermined pressure level. Control then returns to step 92.

While the vent valve 76 is open, fuel within the fuel inlet region will vent into the air intake region and be burned during combustion within the cylinders. Once a sufficient amount of fuel is vented via the vent relief path, the differential pressure (P1–P2) will fall below the predetermined pressure level at step 100 and the vent valve can then be closed at step 106. Thereafter, the dual fuel mode of operation can be enabled at step 108.

The present invention has been shown and described in terms of comparing the differential pressure (P1–P2) with the maximum differential pressure rating of the gaseous fuel admission valves 10. However, it is recognized that such level could be selected at a level which is slightly below or above such maximum differential pressure rating. The predetermined pressure level could also be determined by bench testing of the gaseous fuel admission valves 10. Still further, it is recognized that the invention could incorporate two different differential pressure comparisons. For example, differential pressure (P1–P2) could be compared with a first predetermined pressure level when making an initial determination as to whether the pressure differential is too great to enter a dual fuel mode of operation. If a determination is made that the pressure differential is greater than the first predetermined level the appropriate gaseous fuel venting action can be taken. During gaseous fuel venting the pressure differential (P1–P2) could be compared with a second predetermined pressure level which is slightly less than the first predetermined pressure level. This type of process might be desirable in order to assure that the pressure differential (P1–P2) is sufficiently low enough to assure proper operation of the gaseous fuel admission valves.

Although the present invention has been described with specific reference to the solenoid valve assembly of FIG. 1, there exist numerous gaseous fuel admission valve constructions to which the present invention is equally applicable. The terminology "gaseous fuel admission valve" is intended to cover all such constructions. Further, it is recognized that pressure sensor 64 could be positioned to sense pressure along portion 78 of the fuel vent path, that is somewhere between fuel path 52 and vent valve 76.

Other aspects, objects and advantages of the present invention can be obtained from a study of the drawings, the disclosure and the appended claims.

We claim:

1. A method for relieving a differential pressure across a gaseous fuel admission valve located in a dual fuel engine capable of operating in both a liquid fuel mode and a dual fuel mode, the engine including a gaseous fuel inlet region at a first side of the admission valve and an air intake region at a second side of the admission valve, the engine further including a vent valve positioned between the fuel inlet region and a portion of an air intake path of the engine, the method comprising the steps of:

(a) sensing a pressure at the first side of the admission valve;

(b) sensing a pressure at the second side of the admission valve;

(c) determining whether a difference between the pressures sensed in steps (a) and (b) exceeds a predetermined pressure level; and (d) controlling the open/closed condition of the vent valve based upon the determination made in step (c).

2. The method, as set forth in claim 1, wherein step (d) includes opening the vent valve in response to a determination in step (c) that the pressure difference exceeds the predetermined pressure level.

3. The method, as set forth in claim 2, wherein steps (a), (b), and (c) are repeated until a determination is made in step (c) that the pressure difference is no longer greater than the predetermined pressure level, at which point the vent valve is closed.

4. The method, as set forth in claim 2, wherein dual fuel operation of the engine is inhibited in response to the determination in step (c) that the pressure difference exceeds the predetermined pressure level.

5. The method, as set forth in claim 1, wherein step (d) includes closing the vent valve in response to a determination in step (c) that the pressure difference does not exceed the predetermined pressure level.

6. The method, as set forth in claim 1, wherein the engine is operated in a liquid fuel mode prior to performing steps (a) through (d).

7. The method, as set forth in claim 1, wherein the predetermined pressure level is a pressure level above which the valve is not operable.

8. A fuel pressure relief system for a dual fuel engine capable of operating in both a liquid fuel mode and a dual fuel mode, the engine including at least one gaseous fuel admission valve positioned between a gaseous fuel inlet region and an air intake region, the fuel pressure relief system comprising:

a first pressure sensor positioned in the gaseous fuel inlet region;

a second pressure sensor positioned in the air intake region;

an electronic controller connected to the first pressure sensor and the second pressure sensor for receiving signals therefrom;

a gaseous fuel vent path extending between the gaseous fuel inlet region and a portion of an air intake path; and a vent valve positioned along the gaseous fuel vent path and connected to the electronic controller for control thereby.

9. The fuel pressure relief system, as set forth in claim 8, wherein, prior to initiating a transition from a liquid fuel mode of engine operation to a dual fuel mode of engine operation, the electronic controller is operable to determine a pressure difference between a pressure within the gaseous fuel inlet region and a pressure within the air intake region, and wherein the electronic controller is operable to compare the determined pressure difference to a first predetermined pressure level.

10. The fuel pressure relief system, as set forth in claim 9, wherein the electronic controller is operable to open the vent valve if the pressure difference is determined to exceed the first predetermined pressure level.

11. The fuel pressure relief system, as set forth in claim 10, wherein the electronic controller is operable to inhibit the dual fuel mode of engine operation while the pressure difference exceeds the first predetermined pressure level.

12. The fuel pressure relief system, as set forth in claim 10, wherein the electronic controller is operable to close the vent valve when the pressure difference is determined to fall below a second predetermined pressure level.

13. The fuel pressure relief system, as set forth in claim 12, wherein the first predetermined pressure level and the second predetermined pressure level are the same.

14. The fuel pressure relief system, as set forth in claim 8, wherein the engine includes a turbocharger, the gaseous fuel vent path extending between the gaseous fuel inlet region and an upstream side of the turbocharger.

15. The fuel pressure relief system, as set forth in claim 8, wherein the engine includes a turbocharger, the gaseous fuel vent path extending between the gaseous fuel inlet region and a downstream side of the turbocharger.

16. The fuel pressure relief system, as set forth in claim 8, wherein the engine includes a pressure regulator positioned between a source of gaseous fuel and the gaseous fuel admission valve, the first pressure sensor being located between the pressure regulator and the gaseous fuel admission valve.

17. The fuel pressure relief system, as set forth in claim 16, wherein the engine includes a fuel shut off valve positioned between the pressure regulator and the gaseous fuel admission valve, the first pressure sensor being located between the fuel shut off valve and the gaseous fuel admission valve.

* * * * *